United States Patent [19]

Tanikella

[11] 3,901,853
[45] Aug. 26, 1975

[54] ACID-DYEABLE FIBERS OF POLYESTER MODIFIED WITH A TETRAMETHYLPIPERIDINE COMPOUND HAVING TWO ESTER-FORMING GROUPS

[75] Inventor: Murty S. Tanikella, Newark, Del.

[73] Assignee: E. I. Du Pont de Nemours and Company, Wilmington, Del.

[22] Filed: Sept. 13, 1974

[21] Appl. No.: 505,954

Related U.S. Application Data

[63] Continuation-in-part of Ser. No. 419,440, Nov. 27, 1973, abandoned, and a continuation-in-part of Ser. No. 403,324, Oct. 3, 1973, abandoned, each is a continuation-in-part of Ser. No. 290,771, Sept. 20, 1972, abandoned.

[30] Foreign Application Priority Data

Sept. 17, 1973  Germany............................ 2346734

[52] U.S. Cl. ............ 260/76; 260/47 CZ; 260/75 N; 260/77
[51] Int. Cl.² ........................................ C08G 63/68
[58] Field of Search...................... 260/75 N, 76, 77

[56] References Cited
UNITED STATES PATENTS

2,647,104  7/1953  Shivers................................ 260/75
3,624,181  11/1971  Munakata et al................... 260/926
3,684,765  8/1972  Matsui et al....................... 260/45.8

FOREIGN PATENTS OR APPLICATIONS

7,013,976  3/1971  Netherlands
2,043,748  3/1971  Germany
2,204,659  8/1972  Germany
32,434  8/1972  Japan

OTHER PUBLICATIONS

Lutz et al., *J. Org. Chem.*, 27, 1965–1703 (1962).

*Primary Examiner*—Melvin Goldstein

[57] ABSTRACT

Textile fibers or filaments prepared from polyesters modified with a minor proportion of a 2,2,6,6-tetramethylpiperidine compound to provide dyeability with acid dyes. The tetramethylpiperidine compounds used to modify the polyester have two ester-forming groups and can be mixed wtih polyesters, or polyester-forming compositions, at elevated temperatures to react and copolymerize into polyester molecules without limiting molecular weight as in the case of monofunctional modifiers. Polyesters modified with a variety of difunctional tetramethylpiperidine compounds are illustrated.

16 Claims, No Drawings

3,901,853

ACID-DYEABLE FIBERS OF POLYESTER MODIFIED WITH A TETRAMETHYLPIPERIDINE COMPOUND HAVING TWO ESTER-FORMING GROUPS

REFERENCE TO PREVIOUS APPLICATIONS

This is a continuation-in-part of my copending (and now abandoned) applications Ser. No. 419,440 filed Nov. 27, 1973, and Ser. No. 403,324 filed Oct. 3, 1973, as continuations-in-part of Ser. No. 290,771, filed Sept. 20, 1972 (now abandoned).

BACKGROUND OF THE INVENTION

This invention relates to textile fibers and filaments of linear glycol-terephthalate copolyesters, and is more particularly concerned with products of copolyesters having basic nitrogen-containing groups to provide improved dyeability with acid dyes.

Although many methods have been tried for improving the acid-dyeability of polyester fibers and filaments by incorporating nitrogen-containing modifiers in polyesters, such previous attempts have not provided adequate solutions to the problem for various reasons. In order to provide good dyeability with acid dyes, the modifier should contain a highly basic nitrogen atom which is suitably positioned as a dye site but which does not form a reactive center for polymer degradation reactions. That is, the modifier should be compatible with the polyester and should not result in objectionable discoloration or inadequate molecular weight. The modifier should have sufficient thermal stability for incorporation in the polyester during condensation polymerization and for melt-spinning into filaments. The amount of modifier required for good dyeability should not be so great as to dilute desirable physical properties of the polyester. The modifier should have low volatility to prevent escape with low-boiling compounds removed during the condensation polymerization and should not limit the molecular weight of the acid-dyeable polyester. The melt-spun filaments should retain a high level of dyeability when subjected to heat-setting treatment after drawing. The dyed filaments and fibers should have good dye-lightfastness and resistance to washing or dry cleaning.

SUMMARY OF THE INVENTION

The present invention provides improvements in the above respects in acid-dyeable textile fibers and filaments of linear glycol-terephthalate copolyester molecules containing basic nitrogen atoms. In accordance with this invention, the fibers or filaments are composed of a linear glycol-terephthalate copolyester with a minor proportion, sufficient to provide at least 0.02 weight percent nitrogen, of a 2,2,6,6-tetramethylpiperidine compound having substituents at the 1 and/or 4 positions on the tetramethylpiperidine ring which comprise a total of two ester-forming groups. Each of the ester-forming groups is attached directly to the tetramethylpiperidine ring or is attached to a tetramethylpiperidine substituent. As illustrated subsequently, the tetramethylpiperidine compound may be a glycol, a dicarboxylic acid or alkyl ester thereof, or a hydroxy acid or alkyl ester thereof.

The acid-dyeable linear glycol-terephthalate copolyester preferably comprises at least 85 mole percent ethylene terephthalate polymer units. It may also comprise 2 to 10 weight percent ethylene adipate polymer units. However, any of the glycol-terephthalate polyesters useful in textile fibers can be modified in accordance with this invention to impart good aciddyeability.

Preferably an amount of modifier is used which provides 0.02 to 0.25 weight percent basic nitrogen, based on the weight of the polyester. The 2,2,6,6-tetramethylpiperidine compound preferably has substituents at the 1 and 4 positions of the tetramethylpiperidine ring and each substituent comprises an ester-forming group.

DETAILED DESCRIPTION

The acid-dyeable polyester fibers and filaments of this invention are characterized by the presence of 2,2,6,6-tetramethylpiperidine groups in at least some of the polyester molecules. These acid-dyeable polyesters are surprisingly free from undesirable discoloration. This unexpected achievement is believed to be due, at least in part, to the high basicity of the piperidine nitrogen atom, which leads to strong dye-polymer interactions, and to the presence of the 2,2,6,6-tetramethyl substituents on the piperidine ring which hinder the approach of reactive centers which cause polymer degradation, for example, discoloration and quaternization reactions, to occur. In addition, the difunctional tetramethylpiperidine compounds used to modify polyesters in the practice of this invention are readily copolymerized into polyester molecules and thus their use does not limit molecular weight as does the use of monofunctional modifiers.

The acid dyeability of the polyester composition is dependent on other factors in addition to the base strength of the amine used in its preparation. In general, polyester compositions prepared with a given tetramethylpiperidine compound will have increasing dyeability with increasing nitrogen content, with increasing hydrophilic character at constant nitrogen content, and with increasing content of a conventional copolymerizable compound. The acid-dyeable fibers and filaments of this invention that can be acid dyed at a pH of 3.5 and above are preferred embodiments and those that can be dyed at a pH of 4.5 and above are especially preferred. Of course, lower pH values, e.g., 3.0, can be used when desired.

The tetramethylpiperidine modifier compounds used in this invention must exhibit good thermal stability, since polyester preparation and melt-spinning are carried out at elevated temperatures, e.g., temperatures within the range of 240°–300°C. When the tetramethylpiperidine compound is added to polyester-forming compositions, it should be able to withstand temperatures on the order of 280°C. and up, since such temperatures are required for efficient polymer production. The modifier compounds of this invention do not undergo thermal degradation to produce colored by-products or decomposition products having an adverse effect on polyesters such as, for example, causing excessive reduction in polymer molecular weight.

In addition, modifier compounds used to provide the acid dye sites must be compatible with polyesters. The polyester compatibility of the modifier compounds containing the 2,2,6,6-tetramethylpiperidine group has been found to be surprisingly good. These modifier compounds can be reacted with polyesters or polyester-forming compositions at elevated temperatures without the development of objectionable discoloration or adverse reduction of molecular weight.

The 2,2,6,6-tetramethylpiperidine modifier compounds are secondary or tertiary amines having two ester-forming groups, each group being attached directly to the piperidine ring or attached to a piperidine ring substituent. Where an ester-forming group is attached to a substituent of the piperidine ring, the substituent linkage to the piperidine ring may be, for example, an alkylene, arylene, ether, amide, sulfonamide or s-triazine linkage. Tetramethylpiperidine modifier compounds include piperidine glycols and their ester-forming derivatives; piperidine dicarboxylic acids and their esterforming derivatives; piperidine hydroxyacids and their ester-forming derivatives; and, s-triazine derivatives containing two ester-forming groups.

As suitable glycol-type modifiers there may be mentioned: 1-(2-hydroxyethyl)-2,2,6,6-tetramethyl-4-hydroxypiperidine; 1-(2-hydroxy-2-methylethyl)-2,2,6,6-tetramethyl-4-hydroxypiperidine; 5-(4-hydroxy-2,2,6,6-tetramethyl-1-piperidine)-1-pentanol; 6-[(4-hydroxy-2,2,6,6-tetramethyl-1-piperidino)methoxy]-1-hexanol; 2-methyl-2-[(1,2,2,6,6-pentamethyl-4-piperidyloxy) methyl]-1,3-propanediol; 2-methyl-2-[2-(2,2,6,6-tetramethylpiperidino) ethoxymethyl]-1,3-propanediol; 1,1'-(p-phenylenedimethylene)-bis(2,2,6,6-tetramethyl-4-piperdinol); 1,1'-(2-butenylene)-bis(2,2,6,6-tetramethyl-4-piperidinol); 1,-1'-[tetrametehylenebis(oxymethylene)]bis[2,2,6,6-tetramethyl-4-piperidino]; 1,8-bis(2,2,6,6-tetramethyl-piperidino)-2,7-octanediol; 1,1'-(tetramethylenedioxy)bis(3-[2,2,6,6-tetramethyl-piperidino]-2-propanol); 2,2'-[4,6-bis([2,2,6,6-tetramethyl-4-piperidyl]-amino)-s-triazine-2-ylimino]diethanol and the corresponding 1,2,2,6,6-pentamethyl compound and 2,2'-[6-(2,2,6,6-tetramethyl-4-piperidylamino)-s-triazine-2,4-diyldiimino] diethanol and the corresponding 1,2,2,6,6-pentamethyl compound.

As suitable dicarboxylate-type modifiers there may be mentioned: 5-[(1,2,2,6,6-pentamethyl-4-piperidyloxy)-methyl]-isophthalic acid; 5-[2-(2,2,6,6-tetramethylpiperidine) ethoxymethyl]isophthalic acid, dimethyl ester; 2-[(2,2,6,6-tetramethyl-4-piperidinyl)sulfamoyl] terephthalic acid, dimethyl ester, the corresponding diethyl ester, acid, and 1-methyl derivative and the corresponding carbamoyl compounds; 4-[(2,2,6,6-tetramethyl-4-piperidinyl)sulfamoyl] isophthalic acid, dimethyl ester, the corresponding diethyl ester, acid and 1-methyl derivative and the corresponding carbamoyl compounds; 5-[(2,2,6,6-tetramethyl-4-piperidinyl) sulfamoyl] isophthalic acid, dimethyl ester, the corresponding diethyl ester, acid and 1-methyl derivative and the corresponding carbamoyl compound; 2-[4-(2,2,6,6-tetramethyl-4-piperidinylsulfamoyl)phenoxy] isophthalic acid, dimethyl ester, the corresponding diethyl ester, acid and 1-methyl derivative and the corresponding carbamoyl compounds; 4-[4-(2,2,6,6-tetramethyl-4-piperidinylsulfamoyl)-phenoxy] isophthalic acid, dimethyl ester, the corresponding diethyl ester, acid and 1-methyl derivative and the corresponding carbamoyl compounds; 5-[4-(2,2,6,6-tetramethyl-4-piperidinylsulfamoyl)phenoxy] isophthalic acid, dimethyl ester, the corresponding diethyl ester, acid and 1-methyl derivative and the corresponding carbamoyl compound; 4-[(2,2,6,6-tetramethyl-4-piperidinyl)sulfamoyl]-2,6-naphthalenedicarboxylic acid, dimethyl ester, the corresponding diethyl ester, dicarboxylic acid and 1-methyl derivative and the corresponding carbamoyl compounds; 4-[(2,2,6,6-tetramethyl-4-piperidinyl)sulfamoyl]-2,7-naphthalenedicarboxylic acid, dimethyl ester, the corresponding diethyl ester, dicarboxylic acid and 1-methyl derivative and the corresponding carbamoyl compounds; 2-[(2,2,6,6-tetramethyl-4-piperidinyl)sulfamoyl] fluorene-9,-dipropionic acid, dimethyl ester, the corresponding diethyl ester and acid, and 1-methyl derivative and the corresponding carbamoyl compounds; and 2,9-di(2,2,6,6-tetramethyl-4-piperidyl)decanedioic acid, diethyl ester.

As a suitable hydroxycarboxylate-type modifier there may be mentioned 5-(4-hydroxy-2,2,6,6-tetramethyl-1-piperidine)valeric acid, methyl ester.

As suitable s-triazine-type modifiers containing two ester-forming groups there may be mentioned: 2,4-dimethoxy-6-[(2,2,6,6-tetramethyl-4-piperidyl)amino]-s-triazine, the corresponding 1,2,2,6,6-pentamethyl compound, and the corresponding 2,4-dihydroxy, 2,4-diethoxy, and 2,4-diphenoxy compounds.

Under the polymer-forming conditions employed in the practice of the present invention, the tetramethylpiperidine modifiers react and become part of the polymer molecule. Their presence in polyester fibers is then permanent and they cannot be removed by washing, dry cleaning, and the like.

The basic nitrogen content of the acid-dyeable polyesters should be at least 0.02%, by weight, based on the weight of the modifier polyester. Preferably the weight percent basic nitrogen will be 0.02 to 0.25%, and more preferably, 0.05 to 0.15%.

Polymerization accelerators, such as diphenylterephthalate, may be used if desired. Salts of the tetramethylpiperidine modifier compounds with acids of phosphorus also may be used in the practice of the invention. Suitable acids include phosphoric acid, diphenylphosphinic acid, phenylphosphonic acid, and the like.

By copolyesters is meant fiber-forming linear condensation polymers characterized by carbonyloxy linking radicals

in the polymer chain and by being prepared using 3 or more reactants, each having 2 ester-forming groups. The copolyesters may, if desired, contain additives, e.g., delustrants, viscosity boosters, optical brighteners, toning pigments, antioxidants, and the like. In addition, filaments prepared from these polymers may encompass various cross-sectional configurations such as round, multilobal or hollow.

Examples of linear, fiber-forming condensation polyesters that can be modified in accordance with the present invention are polyethylene terephthalate, polytrimethylene terephthalate, poly(2,2-dimethylpropylene terephthalate), polytetramethylene terephthalate, polyethylene terephthalate/isophthalate (85/15), polyethylene terephthalate/hexahydroterephthalate (90/10), poly(hexahydro-p-xylylene) terephthalate, terephthalate copolyesters containing an aliphatic dicarboxylic acid constituent (especially terephthalate adipate copolyesters) and terephthalate copolyesters containing a branched-chain glycol constituent (especially ethylene/2,2-dimethylpropylene terephthalate copolyesters). Fibers or filaments of modified terephthalate copolyesters are a preferred embodiment of the present invention.

The practice of this invention is particularly important with respect to providing acid-dyeable fibers or filaments of copolyesters containing at least 85 mol percent of ethylene terephthalate units. Filaments of copolyesters such as, for example, terephthalate/adipate copolyesters retain a relatively high level of their dyeability when subjected to heat-setting treatments after they have been drawn.

As indicated above, copolymer compositions containing the 2,2,6,6-tetramethylpiperidine group are basic compounds and, as such, have a relatively high affinity for acid dyes and can be dyed in a range of colors. As illustrations of such acid dyes, there may be mentioned C.I. Acid Blue 25 (C.I. 62055), C.I. Acid Red 4 (C.I. 14710), C.I. Acid Yellow 40 (C.I. 18950), and C.I. Acid Green 25 (C.I. 61570). Fibers of these polymer compositions can be combined with other polyester fibers to provide fabrics that can be dyed to multicolors in a single dye bath. In general, the dyed fibers of the present invention have good dye lightfastness.

The dyeability of the filaments of this invention may be determined by measuring the amount of dye left in the dye bath after dyeing in a standard manner. The whiteness of the filaments may be measured by means known to those skilled in the art, for example, reflectance determination using a reflectometer. In general, whiteness will improve as the purity of the compounds used is improved and will improve by following known practices for avoiding degradation and by minimizing the exposure of the compositions to oxygen at elevated temperatures. If desired, toners and brighteners can be added to increase fiber whiteness.

The polyester compositions used in this invention usually will have a relative viscosity between 7.5 and 85; preferably the relative viscosity will be from about 11 to about 30. The relative viscosity is determined by measuring the ratio of the viscosity of a solution containing 4.75% by weight of the polymer, in hexafluoroisopropanol containing 100 parts per million, by volume, of concentrated sulfuric acid, to the viscosity of the hexafluoroisopropanol sulfuric acid solvent measured in the same units at $25° \pm 0.05°C$.

The nitrogen content of the modified polyesters is determined using the micro Kjeldahl method of analysis. Where the value determined includes nitrogen other than nitrogen from the piperidine ring, i.e., non-basic nitrogen, the basic nitrogen content is calculated by multiplying the measured nitrogen content by the fraction of the total number of nitrogen atoms in the modifier that are piperidine ring nitrogen atoms.

In the procedures and examples that follow, all percentages given are by weight based on total weight except as indicated otherwise, and in the examples all scour and dye baths use a bath-to-fabric weight ratio of 40:1, except as indicated otherwise, and the wetting agent used is octylphenol condensed with 9–10 moles of ethylene oxide. Also, the expression "cut to flake and solid-phase polymerized" means the polymer was cut to flake in an Abbe rotary cutter (Abbe Engineering Co., New York, New York) and passes through a perforated metal screen having holes 0.125-inch (0.318-centimeter) in diameter and this flake is solid-phase polymerized by heating it at 190°C. at less than 5 torr, except as indicated otherwise, for the indicated period of time. If the flake is stored, rather than used following its preparation, it is dried prior to spinning. Unless otherwise indicated, the dye carrier used in the examples is a composition comprising about 50% methyl $p$-toluate, 25% methyl benzoate and 25% biphenyl.

Filaments prepared in the examples have a low level of color; that is, while they are not pure white, the color is acceptable.

PREPARATION OF TETRAMETHYLPIPERIDINE MODIFIERS

Representative procedures for preparation of 2,2,6,6-tetramethylpiperidine modifiers for use in the practice of this invention are given below:

I.
1-(2-Hydroxyethyl)-2,2,6,6-Tetramethyl-4-Hydroxypiperidine

Method (A)

A sample of 157 grams of 2,2,6,6-tetramethyl-4-hydroxypiperidine is placed in a 400-milliliter stainless steel bomb, which is cooled to −78°C. The bomb is evacuated, filled with nitrogen at atmospheric pressure, and reevacuated. The bomb is placed on a scale and connected to a supply of ethylene oxide by a flexible tube. Ethylene oxide is allowed to pass into the bomb until the increase in weight is 52 grams. The bomb is then sealed and disconnected from the ethylene oxide supply. The bomb is held at 110°C. for 1 hour, 120°C. for 1 hour, 130°C. for 1 hour and at 155°–160°C. for 4 hours. The bomb and charge are cooled, and 204 grams of product are removed. The crude material is sublimed twice at 150°C. at a pressure of less than 1 torr to give 1-(2-hydroxyethyl)-2,2,6,6-tetramethyl-4-hydroxypiperidine as a white product melting at 180°–183°C.

Method (B)

In a heavy-wall, polymer tube is placed 2,2,6,6-tetramethyl-4-hydroxypiperidine and 2-chloroethanol in a molar ratio of 1 to 3. The tube is purged with nitrogen, evacuated and sealed. It is then heated in a salt bath at 160°C. for 1 hour. The contents become a clear solution at 130°–140°C. and start forming the hydrochloride salt at 150°–160°C. At the end of the heating period, the seal of the tube is broken and the contents repeatedly washed with ether to remove the unreacted piperidine. The hydrochloride salt is then dissolved in water and the solution made strongly basic with aqueous potassium hydroxide and extracted 4 times with ether. The four ether layers are combined, dried over potassium carbonate and the ether distilled. The solid, a combination of the unreacted piperidine and the 2-hydroxyethyl derivative, is purified by sublimation. The unreacted piperidine is removed by sublimation at 100°C. at about 0.1 torr. The remaining solid is the 1-(2-hydroxyethyl)-2,2,6,6-tetramethyl-4-hydroxypiperidine and is sublimed at 135°C. at about 0.1 torr. The sublimed product melts at 169° to 174°C.

II.
1-(2-Hydroxy-2-Methylethyl)-2,2,6,6-Tetramethyl-4-Hydroxypiperidine

To a 400-milliliter stainless steel bomb is added 117.5 grams of 2,2,6,6-tetramethyl-4-hydroxypiperidine. The bomb and charge are cooled to −78°C, and the bomb is evacuated; filled with nitrogen at atmospheric pressure and re-evacuated. A dropping funnel is attached to the bomb and 60 grams of 1,2-propylene oxide is added, as determined by the weighing of the bomb before and after the addition. The bomb is then sealed and held at 110°C, for 1 hour, 125°C. for 1 hours, 140°C. for 1 hour and 155°–160°C. for 8 hours. The bomb is then cooled and 164 grams of product is removed. This product is placed in a flask and the pressure reduced to permit the removal of 6 grams of excess propylene oxide yielding 158 grams of 1-(2-methyl-2-hydroxyethyl)-2,2,6,6-tetramethyl-4-hydroxypiperidine.

III. 1,1'-(p-Phenylenedimethylene) Bis(2,2,6,6-Tetramethyl-4-Piperidinol)

In a 500 milliliter, round-bottomed flask are placed 11.4 grams of α,α'-dibromo-p-xylene, 25.2 grams of 2,-2,6,6-tetramethyl-4-hydroxypiperidine and 120 milliliters of diglyme (dimethyl ether of diethylene glycol). The contents are refluxed for 19 hours with vigorous stirring and filtered hot. The diglyme from the filtrate is removed by distillation. The remaining solid is washed with methanol. The solid is then washed repeatedly with ether. The 1,1'-(p-phenylenedimethylene)bis(2,2,6,6-tetramethyl-4-piperidinol) is obtained as a white crystalline solid, is dried in a vacuum oven and has a melting point of 237°–239°C.

IV. 1,1'-(2-Butenylene) Bis(2,2,6,6-Tetramethyl-4-Piperidinol)

In a 500-milliliter, round-bottomed flask are placed 21.4 grams of 1,4-dibromo-2-butene, 63 grams of 2,2,-6,6-tetramethyl-4-hydroxypiperidine and 200 milliliters of diglyme. The contents are refluxed for 3.5 hours and filtered hot. The diglyme in the filtrate is removed by distillation. The remaining solid is then washed with water. The solid is then dissolved in methanol treated with activated charcoal and filtered. Methanol is removed from the filtrate. The off-white, crystalline solid is dissolved in an acetone/methanol mixture, treated with activated charcoal and filtered. The solvent from the filtrate is removed on a rotary evaporator. The 1,1'-(2-butenylene) bis(2,2,6,6-tetramethyl-4-piperidinol) is obtained as a white crystalline solid which is dried in a vacuum oven at 80°C. and found to melt at 204°C.

V. 2,2'-[4,6-bis([2,2,6,6-Tetramethyl-4-Piperidyl]amino)-s-Triazine-2-Ylimino]diethanol In a 1 liter, round-bottomed flask are placed 36.9 grams of cyanuric chloride, 100 milliliters of acetone and 50 milliliters of water. This is cooled to 0–5°C. To this mixture are added 21 grams of diethanol amine and a solution of 8 grams of NaOH in 50 milliliters of water. The contents of the flask are stirred at 0–5°C. for one-half hour, filtered cold and washed with water. A yield of 34 grams of crude 2,2'-(4,6-dichloro-s-triazine-2-ylimino)-diethanol is obtained. The material is recrystallized from methanol to have a melting point of 144°–146°C.

In a 300-milliliter, round-bottomed flask are placed 6.3 grams of 2,2'-(4,6-dichloro-s-triazine-2-ylimino)diethanol, 100 milliliters of dioxane and 7.8 grams of 4-amino-2,2,6,6-tetramethylpiperidine. The contents are refluxed for 1 hour and filtered. The white crystalline solid is dissolved in water and excess NaOH added. White crystals separate and they are filtered and washed with water. The yield is 5.5 grams of 2,2'-[4,6-bis([2,2,6,6-tetramethyl-4-piperidyl]amino)-s-triazine-2-ylimino]diethanol as white crystals melting at 121° to 122°C.

VI. 5-[(2,2,6,6-Tetramethyl-4-Piperidinyl)sulfamoyl]-Isophthalic Acid, Dimethyl Ester A 2-liter flask is fitted with a reflux condenser, drying tube, thermometer, and mechanical stirrer. To this is added 300 milliliters of thionyl chloride and 15 milliliters of dimethyl formamide. With stirring, 296 grams of the sodium salt of 5-sulfoisophthalic acid, dimethyl ester, is added portionwise. The mixture of solids and liquid is heated to reflux for 3 hours at which point 600 milliliters of benzene is added. Heating is continued for 20 minutes, the solution allowed to cool, and the precipitated sodium chloride removed by filtration. The benzene and excess thionyl chloride are stripped under vacuum and the residue is taken up in 475 milliliters of hot benzene. The insolubles are filtered off and the solvent again removed under vacuum. The residual crude sulfonyl chloride is crystallized from a mixture of benzenehexane to yield 246 grams of 5-(chlorosulfonyl)isophthalic acid, dimethyl ester as off-white needles melting at 115° to 119°C.

To a solution of 39 grams (0.25 mole) of 4-amino-2,2,6,6-tetramethylpiperidine in 300 milliliters of methylene chloride, is added dropwise 80 grams (0.27 mole) of 5-(chlorosulfonyl)isophthalic acid, dimethyl ester, dissolved in 200 milliliters of methylene chloride. The reaction is mildly exothermic and the reaction temperature is maintained below 30°C. by means of a water bath. The white hydrochloride salt precipitates during the addition.

After stirring overnight, the hydrochloride salt is collected by filtration, washed with methylene chloride and dried. The dry hydrochloride salt is slurried in 500 milliliters of methanol and neutralized by the addition of 13.7 grams of sodium methylate. After stirring for 30 minutes, the product is collected by filtration, washed with 50 milliliters of methanol followed by three 50-milliliter portions of water and finally by a 75-milliliter portion of methanol.

This crude product is placed in a Soxhlet thimble and continuously extracted with methanol for 2 days. The crystals in the pot were collected and recrystallized from an ethanol-hexane mixture to yield 88 grams (78%) of pure Compound VI as very fine, white crystals, melting at 223° to 224°C.

VII. 5-[(1,2,2,6,6-Pentamethyl-4-Piperidinyl)sulfamoyl-]Isophthalic Acid, Dimethyl Ester To a solution of 6.8 grams (0.04 mole) of 4-amino-1,2,2,6,6-pentamethylpiperidine in 50 milliliters of methylene chloride, is added dropwise, over 30 minutes, 11.7 grams (0.04 mole) of 5-chlorosulfonyl)isophthalic acid, dimethyl ester, dissolved in 40 milliliters of methylene chloride. The reaction is mildly exothermic and the reaction temperature is maintained between 25° and 30°C. by means of a water bath. A white precipitate of the hydrochloride salt forms during the addition.

After stirring overnight, the hydrochloride salt is neutralized by addition of aqueous potassium carbonate. The phases are separated, the methylene chloride phase dried with anhydrous $Na_2SO_4$ and the solvent stripped under vacuum. The white residue is crystallized from ethanol-hexane to yield 11.5 grams (68%) of Compound VII as white crystals melting at 143° to 145°C.

VIII.

5-[(2,2,6,6-Tetramethyl-4-Piperidinyl)sulfamoyl]-Isophthalic Acid, Diethyl Ester To a solution of 26.5 grams (0.17 mole) of 4-amino-2,2,6,6-tetramethylpiperidine in 200 milliliters of methylene chloride, is added dropwise 54 grams (0.185 mole) of 5-(chlorosulfonyl)isophthalic acid, dimethyl ester, dissolved in 150 milliliters of methylene chloride. The reaction temperature is maintained below 30°C. by means of a water bath. After stirring overnight, the white hydrochloride salt is collected by filtration, washed with methylene chloride, and dried.

The solid is transferred to a 2-liter flask. About 1.5 liters of absolute ethanol is added along with about 50 grams of potassium carbonate. The mixture is heated to a boil for 1 hour with any loss of solvent being made up by the addition of fresh ethanol. The ethanol is then decanted, about 1 liter is added to the residual solids and the heating process is repeated. The remaining solid is filtered off, the combined ethanol extract evaporated to dryness under vacuum and the residue slurried in water. The mixture is filtered and the crude sulfonamide crystallized from ethanol to yield 45 grams (62%) of Compound VIII as white crystals melting at 179° to 182°C.

IX.

5-[(2,2,6,6-Tetramethyl-4-Piperidinyl)sulfamoyl]-Isophthalic Acid

To a stirred solution of 400 milliliters of 5 N KOH is added 100 grams (0.22 mole) of the hydrochloride salt of 5-[(2,2,6,6-tetramethyl-4-piperidinyl)sulfamoyl]-isophthalic acid, dimethyl ester. As the ester hydrolyzes the sulfonamide gradually goes into solution. The hydrolysis is exothermic. The reaction temperature is kept below 15°C. by addition of ice to the flask. After stirring 25 minutes, the solution is filtered and the filtrate acidified to about pH 4 at which point the diacid precipitates as a white solid. This is collected, washed with water, redissolved in aqueous potassium bicarbonate, filtered and reprecipitated by the addition of acetic acid. Collection of the solid, washing with water, and drying under vacuum at 100°C. yields 74 grams (83%) of Compound IX as a white powder melting at 381°C.

X.

5-[(1,2,2,6,6-Pentamethyl-4-Piperidinyl)sulfamoyl]isophthalic Acid

To a stirred solution of 250 milliliters of 5 N KOH is added 30 grams of the hydrochloride salt of 5-[(1,2,2,6,6-pentamethyl-4-piperidinyl)sulfamoyl]-isophthalic acid, dimethyl ester. As the ester hydrolyzes, the sulfonamide gradually goes into solution. The reaction temperature is kept below 15°C. by addition of ice to the flask. After stirring 25 minutes, the solution is filtered and the filtrate acidified to about pH 4 at which point the diacid precipitates as a white solid. This is collected, washed with water, redissolved in aqueous potassium bicarbonate, filtered and reprecipitated by the addition of acetic acid. Collection of the solid, washing with water and drying under vacuum at 100°C. yields 20.7 grams of the partially hydrated Compound X as a white powder having a melting point of 324°C.

XI.

[(2,2,6,6-Tetramethyl-4-Piperidinyl)Sulfamoyl]Fluoroene-9,9-Dipropionic Acid, Dimethyl Ester To a stirred mixture of 50 milliliters of thionyl chloride and 1 milliliter of dimethyl formamide is added 13.2 grams of the sodium salt of a mixture of isomers of sulfo-fluorene-9,9-dipropionic acid, dimethyl ester, and the resulting slurry is then heated to reflux for 3 hours. The excess thionyl chloride is then removed under vacuum. The residue is treated with 150 milliliters of hot benzene and the insoluble sodium chloride is filtered off. The benzene is stripped and the crude sulfonyl chloride is crystallized from a mixture of benzene-hexane to yield 9.5 grams of an isomer mixture of chlorosulfonyl-fluorene-9,9-dipropionic acid, dimethyl ester, as off-white crystals melting at 142° to 143°C.

To a solution of 3.0 grams (0.019 mole) of 4-amino-2,2,6,6-tetramethylpiperidine in 30 milliliters of methylene chloride, is added dropwise 8.5 grams of the isomer mixture of (chlorosulfonyl)fluorene-9,9-dipropionic acid, dimethyl ester, dissolved in 30 milliliters of methylene chloride. The reaction is mildly exothermic and the reaction temperature is maintained below 30°C. by means of a water bath. A heavy white precipitate forms during the addition.

After stirring overnight, this hydrochloride salt is collected by filtration, washed with methylene chloride and dried to yield 10.4 grams (91%) of product. The hydrochloride salt is slurried in 200 milliliters of methanol and neutralized by the addition of 0.95 gram of sodium methylate at which point the free base goes into solution. The methanol is removed under vacuum and the residue slurred in water. The product is filtered off, dried and crystallized from ethyl acetate-hexane to yield 7.5 grams (77%) of Compound XI as white crystals melting at 130° to 132°C.

XII.

N,N'-[6-([2,2,6,6-Tetramethyl-4-Piperidyl]amino)-s-Triazine-2,4-diyl]diglycine To 350 milliliters of ice water is added 61.5 grams of cyanuric chloride dissolved in hot acetone. The resultant slurry is kept below 10°C. while 53 grams of 4-amino-2,2,6,6-tetramethylpiperidine is added. This is followed by 17.7 grams of sodium carbonate dissolved in a small amount of water. The resulting mixture is stirred for 1.5 hours while maintaining the temperature between 0° and 5°C. The solid is collected, washed with water, and dried under vacuum at 80°C. to yield 97 grams (95%) of 2,4-dichloro-6-(2,2,6,6-tetramethyl-4-piperidylamino)-s-triazine as a white powder.

To a suspension of 61 grams of this dichloroaminotriazine in 600 milliliters of a water-ice mixture is added dropwise over 20 minutes a solution containing 31 grams of glycine, 65 grams of 50% sodium hydroxide, and 100 milliliters of water. The mixture initially turns yellow, but the color gradually fades. Most of the solids dissolve by the end of the addition. The mixture is stirred overnight.

The mixture is then heated to reflux for 2 hours, cooled and filtered. The filtrate is made acidic with dilute hydrochloric acid and then brought up to about pH 4 by the addition of sodium carbonate to precipitate the product as a fine, white solid. This is collected by filtration and washed with water. This crude product is reprecipitated once by dissolving in aqueous potassium carbonate followed by careful acidification to about pH 4 with dilute hydrochloric acid. The solid is dried under vacuum at 100°C. to hield 46 grams (56%) of N,N'-[6-([2,2,6,6-tetramethyl-4-piperidyl]amino)-s-triazine-2,4-diyl]diglycine melting at 385°C.

XIII.
2,9-Di(2,2,6,6-Tetramethyl-4-Piperidyl)Decanedioic Acid, Diethyl Ester

Ethyl-α-cyano(2,2,6,6-tetramethylpiperidine-$\Delta^1,\alpha$) acetate, hydrochloride salt The general procedure employed is that of McElvain and Lyle (J. Amer. Chem. Soc., 72, 384 (1950)).

A mixture of 23.3 grams (0.15 mole) of 2,2,6,6-tetramethyl-4-piperidine, 25.5 grams (0.22 mole) of ethyl cyanoacetate, 2.4 grams ammonium acetate, 6.9 grams glacial acetic acid and 150 milliliters of benzene is heated at reflux in a Dean Stark apparatus until the theoretical amount of water is collected in the trap (3–4 hours). The dark solution is cooled, 150 milliliters of ether added, and the solution saturated with gaseous hydrogen chloride. The precipitated salt is filtered, washed with ether and vacuum dried to give 36.5 grams (85% yield) of a light tan solid. Recrystallization from absolute ethanol produced colorless crystals melting at 239°C.

Ethyl-α-cyano(2,2,6,6-tetramethylpiperidine-$\Delta^1,\alpha$)acetate

Five grams (0.107 mole) of the above salt is dissolved in 40 milliliters of water, the solution made alkaline with solid sodium carbonate, and the product salted out with sodium chloride and extracted into ether. The ether layer is dried (4A molecular sieves), and on solvent removal a yellow oil is obtained, which crystallizes on cooling and trituration with petroleum ether to give 3.8 grams (87% yield) of a white solid melting at 62° to 64°C.

Ethyl-α-cyano(2,2,6,6-tetramethyl-4-piperidine)acetate

A solution of 17 grams (0.068 mole) of ethyl-α-cyano-(2,2,6,6-tetramethylpiperidine-$\Delta^1,\alpha$) acetate in 200 milliliters of sodium-dried ethanol, which has been purged with nitrogen, is hydrogenated at 25°C. and one atmosphere of hydrogen over 3 grams of 10% palladium on charcoal for a period of 3.5 hours in an efficiently stirred vessel. Removal of the catalyst and evaporation of the solvent gives a pale yellow oil, which is passed down a short column of Woelm neutral alumina and eluted with benzene. Solvent evaporation gives 16.0 grams (93% yield) of ethyl-α-cyano(2,2,6,6-tetramethyl-4-piperidine) acetate boiling at 120°C. at 11 torr.

Diethyl-2,9-dicyano-2,9-di(2,2,6,6-tetramethyl-4-piperidine) decanoate

A solution of 12.5 grams (0.05 mole) of ethyl-α-cyano-(2,2,6,6-tetramethyl-4-piperidine) acetate in 150 milliliters of dry dimethyl sulfoxide is charged to a flame-dried, nitrogen-flushed reactor which in turn is connected to an appropriate device for measuring hydrogen evolution. One and two-tenths grams (0.05 mole) of neat sodium hydride is added in portions to the stirred solution, which is maintained at about 20°C. until hydrogen evolution ceases. A solution of 5.3 grams (0.026 mole) of 1,6-dibromohexane in 10 milliliters of dry dimethyl sulfoxide is added dropwise, and the resulting suspension maintained below 35°C. until addition is complete. The mixture is then stirred overnight at room temperature and under a slow nitrogen purge. The yellow solution obtained is poured into 700 milliliters of ice water and the cream precipitate is isolated by filtration, dissolved in methylene chloride, washed with water and dried over 4A molecular sieves. Evaporation of the solvent gives the product as a white crystalline solid (11 grams, 75.1% yield), melting at 162° to 164°C.

2,9-bis(2,2,6,6-tetramethyl-4-piperidine)decanedinitrile

A warm solution of 3.7 grams (0.066 mole) of potassium hydroxide in 170 milliliters of ethylene glycol is added to 11.72 grams (0.02 mole) of diethyl-2,9-dicyano-2,9-bis(2,2,6,6-tetramethyl-4-piperidine) decanoate and the mixture is heated at reflux for 3 hours. The cooled solution is then poured into 230 milliliters of cold water and thoroughly extracted with portions of methylene chloride. After drying (4A molecular sieves), the solvent is removed to give 8.15 grams (92% yield) of a white crystalline solid, melting at 133° to 135°C.

2,9-Di(2,2,6,6-tetramethyl-4-piperidyl)decanedioic acid, diethyl ester

A mixture of 25 grams (0.057 mole) of 2,9-bis(2,2,6,6-tetramethyl-4-piperidine)decanedinitrile and 150 milliliters of concentrated hydrochloric acid is heated at reflux for 20 hours. Evaporation of the water leaves a sticky residue from which the last traces of water are removed by azeotropic drying (benzene). Two-hundred milliliters of absolute ethanol and 5 milliliters of concentrated sulfuric acid are added and the mixture is heated at reflux for 18 hours. The solvent is removed in vacuo, the residual material rendered alkaline with anhydrous potassium carbonate, and the product thoroughly extracted with methylene chloride and dried over 4A molecular sieves. Removal of the solvent in vacuo gives 30 grams of an orange oil, whose infrared spectrum shows, in addition to the product, bands indicative of an amide function.

The oil is subjected to chromatography on Woelm neutral alumina and the column eluted with benzene-chloroform mixtures of increasing polarity. The fraction from 3:2 benzene:chloroform is the major fraction and monitoring by infrared reveals essentially complete loss of the amide band. Solvent removal gives 21.5 grams (70.4% yield) of 2,9-di(2,2,6,6-tetramethyl-4-piperidyl)decanedioic acid, diethyl ester, as a straw-colored, thick oil. Thermal analysis estimates the boiling point as 272°C at 2.7 torr.

XIV.

2,4-Dimethoxy-6-[(2,2,6,6-Tetramethyl-4-Piperidyl)-amino]-s-Triazine

In a 200milliliter, round-bottomed flask are placed 60 milliliters of dioxane and 4.4 grams of 2,4-dimethoxy-6-chloro-s-triazine, which can be prepared as described by Dudley et al., J. Amer. Chem. Soc., 73, 2986 (1951). To this is added 3.9 grams of 4-amino-2,2,6,6-tetramethylpiperidine at room temperature. A white precipitate is formed as soon as the reactants are mixed. The contents are stirred vigorously at room temperature for 20 minutes and then filtered. The white crystals are dissolved in water, excess aqueous NaOH added and the solution extracted twice with ether. The ether solutions are heated on a steam bath to remove the ether, leaving 2,4-dimethoxy-6-[(2,2,6,6-tetramethyl-4-piperidyl)-amino]-s-triazine as a white crystalline solid; the yield is 4.4 grams and the crystals melt at 167° to 168°C.

XV.

2,4-Dimethoxy-6-[(1,2,2,6,6-Pentamethyl-4-Piperidyl)-amino]-s-Triazine

In a 200-milliliter, round-bottomed flask are placed 3.3 grams of 2,4-dimethoxy-6-chloro-s-triazine and 70 milliliters of benzene. To this are added 3.2 grams of 4-amino- 1,2,2,6,6-pentamethylpiperidine and the contents refluxed for 3 hours. A white precipitate separates and it is filtered and discarded. The filtrate is maintained at room temperature for 1 week. A white crystalline precipitate separate. It is filtered, dissolved in water, excess aqueous $Na_2CO_3$ added and extracted twice with ether. The ether solution is heated on a steam bath to remove the ether, leaving a small amount of 2,4-dimethoxy-6-[(1,2,2,6,6-pentamethyl-4-piperidyl)-amino]-s-triazine as a white crystalline solid; the yield is about 0.2 to 0.3 gram and the crystals melt at 143° to 145°C.

EXAMPLE 1

This example illustrates the use of 1-(2-hydroxyethyl)-2,2,6,6-tetramethyl-4-hydroxypiperidine, Compound I, in preparing acid-dyeable copolyester filaments.

A. A mixture of 75 grams of polytetramethylene terephthalate, as flake with a relative viscosity of 66.5 and 0.90 gram of Compound I is placed in a polymer test tube, and the tube evacuated and filled with nitrogen 5 times. The tube is equipped with a rubber stopper. A stainless steel tube passes through the center of the stopper and carries a short section of rubber tubing at its top. The rubber tubing is lubricated with mineral oil and is passed over the shaft of a helical stirrer. The stopper also carries a second stainless steel tube for the passage of gas. The polymer is melted and the mixture is blended for 15 minutes under nitrogen. The blended polymer is cooled, cut to flake and solid-phase polymerized for 6 days.

The flake is then spun into a 5-filament yarn at a pack-block temperature of 232°C. and a spinneret temperature of 232°C. The filaments have a relative viscosity of 16.9 and contain 0.095% nitrogen.

The yarn is drawn 3X in two stages. The yarn passes from a feed roll at 21.7 yards (19.8 meters) per minute, over a pin heated at 85°C. at      yards (45.7 meters) per minute, over a second pin heated at 73°C. at 65 yards (59.4 meters) per minute and is wound up at 63 yards (57.6 meters) per minute. The resulting yarn has a denier of 41, a tenacity of 1.1 grams per denier and an elongation of 82.4%. The yarn is knit into fabric.

The fabric is scoured for 30 minutes at the boil in a bath containing 1% of wetting agent and 1% of tetrasodium pyrophosphate and rinsed with hot water.

The fabric is dyed in baths having a pH of 3.0 and 6.0 at 121°C. in a pressure dyer with dye carrier. Each bath contains 2% owf of C.I. Acid Blue 25 (C.I. 62055) and 15% owf of dye carrier. The fabrics are held in the baths for 90 minutes. The dyed fabrics are scoured 30 minutes at 82°C. in a bath containing, by weight, 1% of the wetting agent and 0.5% acetic acid. The fabric dyes to a deep shade of blue at pH 3.0 and to a light shade at pH 6.0.

B. In a separate experiment, 7.5 grams of Compound I and 500 grams of a polyethylene terephthalate prepolymer powder with a relative viscosity of 3.2 are mixed in a two-liter, three-necked flask. The flask is evacuated and re-filled with nitrogen five times. The charge is melted under nitrogen at 283°C., the pressure is slowly reduced to less than 1 torr and the charge is stirred under these conditions for 55 minutes. The polymer is cooled under nitrogen and cut to flake. The flake has a relative viscosity of 19.3, and contains 0.10% nitrogen.

The flake is dried and spun to a 17-filament yarn at pack block and spinneret temperatures of 285°C., and the yarn is wound up undrawn at 300 yards (273 meters) per minute. The yarn is drawn 4.8× in two stages. The yarn passes from a feed roll at 50 yards (45.5 meters) per minute over a hot pin at 70°C. to a first-stage roll at 157 yards (143 meters) per minute, over a hot plate at 105°C. and to a second stage roll at 241 yards (220 meters) per minute. The yarn is then wound up at 240 yards (218.4 meters) per minute. The resulting 50-denier yarn has a tenacity of 3.7 and an elongation of 15%. Three yarns thus prepared are plied and knit into fabric. The fabric is scoured and dyed at pH 3.5 using the procedure described above. The fabric dyes to a light shade.

EXAMPLE 2

This example illustrates the use of 1-(2-hydroxy-2-methylethyl)-2,2,6,6-tetramethyl-4-hydroxypiperidine, Compound II, in preparing acid-dyeable copolyester filaments.

Polymer is prepared in a polymer test tube from 60 grams of a copolymer having a relative viscosity of 19.6 and 0.77 gram of Compound II. The copolymer has 94 mole percent of ethylene terephthalate units and 6 mole percent ethylene adipate units. The contents are purged with nitrogen and evacuated, the cycle being repeated 4 times. The contents are then heated at 255°C. under nitrogen until melted, stirred for 0.5 hour at 255°C. and then heated at about 1 torr at 255°C. for 1 hour. The polymer is cooled and cut to flake. The flake contains 0.07% nitrogen. The flake is solid-phase polymerized for 90 hours at 190°C. at not over 1 torr. The resulting polymer has a relative viscosity of 49.0.

The polymer is spun into a 5-filament yarn at a block temperature of 270°C. and a spinneret temperature of 268°C. and is wound to a package at 11.7 yards (10.7 meters) per minute.

The yarn is drawn 4.5×. The yarn passes from a feed roll at 16.7 yards (15.3 meters) per minute, over a pin heated at 83°C., to a draw roll at 75 yards (68.6 meters) per minute and wound up at 74 yards (67.7 meters) per minute. Two yarns produced as above are plied. The plied yarn has a denier of 76, a tenacity of 3.8 grams per denier and an elongation of 21.9%. The yarn is knit into fabric, which is scoured and dyed using the procedure described in Example 1. The fabric dyes to a medium shade of blue.

EXAMPLE 3

This example illustrates the use of 1,1'-(2-butenylene) bis(2,2,6,6-tetramethyl-4-piperidinol), Compound IV, in preparing acid-dyeable copolyester filaments.

Sixty grams of dry, previously prepared, polyethylene terephthalate containing copolymerized adipate units corresponding to 5.5 mole percent adipic acid is placed in a polymer test tube. To this are added 1.3 grams of Compound IV. The polymer test tube is provided with a rubber stopper, a stirrer and a glass tube. The contents are purged with nitrogen and evacuated; the process repeated 4 to 5 times. The contents are then heated until melted at 255°C. under nitrogen, about 20 minutes, stirred under nitrogen for 0.5 hour and then for 1 hour at a pressure of less than 1 torr. The polymer is then put under nitrogen and cooled. The polymer is cut to flake. The flake contains 0.13% nitrogen.

The flake is then solid-phase polymerized at 190°C. for 160 hours at a pressure of less than 1 torr. The polymer has a relative viscosity of 34.7.

The flake is then melted and spun into a 5-filament yarn at a block temperature of 267°C. and a spinneret temperature of 270°C. and wound to a package. In a separate step, the yarn is drawn 4.5× on a hot pin at 85°C. at a draw roll speed of 75 yards (68.6 meters) per minute. The drawn yarn is then two plied. The two-plied yarn has a denier of 74.3, a tenacity of 3.0 grams per denier and an elongation of 27%.

The yarn is knit into fabric which is scoured and dyed using the procedure described in Example 1. Dyeings are made at pH 3.0 and 4.5 and the fabric dyes to a medium shade of blue.

EXAMPLE 4

This example illustrates the use of 2,2'-[4,6-bis([2,2,6,6-tetramethyl-4-piperidyl]amino)-s-triazine-2-ylimino]-diethanol, Compound V, in preparing acid-dyeable copolyester filaments.

A dry ethylene terephthalate polyester having a relative viscosity of 30.8 and containing about 5.5 mole percent adipate units is placed in a polymer test tube. The tube is provided with a rubber stopper carrying a stirrer, a glass tube and another glass tube connected with a rubber tube to a test tube containing 2.8 grams of Compound V. The contents are purged with nitrogen and evacuated; the process being repeated 4 times. The contents of the polymer tube are then heated until melted at 255°C. under nitrogen, about 20 minutes, Compound V is added and the mixture is stirred under nitrogen at 255°C. for 0.5 hour. The polymer is then put under nitrogen and cooled. The polymer is cut to flake and the nitrogen content determined. The polymer is calculated to contain 0.11% basic nitrogen. The flake is solid-phase polymerized at 190°C. at a pressure of less than 1 torr for 190 hours and this product is found to have a relative viscosity of 12.2.

The polymer is then spun into a 5-filament yarn at a spinning block temperature of 245°C. and a spinneret temperature of 245°C. and wound to a package. The spun yarn is drawn over a hot pin at 85°C. The draw ratio is 2.0 and the feed roll speed is 16.7 yards (15.3 meters) per minute. Two of the drawn yarns are plied and skeins scoured and dyed at pH 3.0 and 4.5, using the procedure described in Example 1. Both skeins dye to a dark blue shade.

EXAMPLE 5

This example illustrates the use of 5-[(2,2,6,6-tetramethyl-4-piperidinyl)sulfamoyl]isophthalic acid, dimethyl ester, Compound VI in preparing acid-dyeable copolyester filaments.

A dry ethylene terephthalate polyester having a relative viscosity of 19.5 and containing about 5.5 percent adipate units is placed in a polymer test tube with 2.5 grams of Compound VI. The tube is provided with a rubber stopper carrying a stirrer and a glass tube. The contents are purged with nitrogen and evacuated; the process being repeated 4 times. The contents are then heated until melted at 255°C. under nitrogen, about 20 minutes, stirred under nitrogen at 255°C. for 0.5 hour and then stirred for 1 hour at 225°C. at a pressure of less than 1 torr. The polymer is then put under nitrogen and cooled. The polymer is cut to flake and the nitrogen content determined. The polymer is calculated to contain 0.11% basic nitrogen. The flake is solid-phase polymerized at 190°C. at a pressure of less than 1 torr for 113 hours and this product is found to have a relative viscosity of 17.1.

The polymer is then spun into a 5-filament yarn at a spinning block temperature of 257°C. and a spinneret temperature of 248°C. and wound to a package. The spun yarn is drawn over a hot pin at 83°C. The draw ratio is 4.5 and the feed roll speed is 16.7 yards (15.3 meters) per minute. Two of the drawn yarns are plied. The plied yarn has a denier of 56.5, a tenacity of 2.3 grams per denier and an elongation of 34%. The plied yarn is knit to a fabric and the fabric scoured and dyed at pH 3.0 and 4.5 using the procedure described in Example 1. Both fabrics dye to a dark shade of blue.

EXAMPLE 6

This example illustrates the use of a reduced amount of Compound VI in preparing filaments of an acid-dyeable copolyester.

A dry ethylene terephthalate polyester having a relative viscosity of 19.5 and containing about 5.5 mole percent adipate units is placed in a polymer test tube with 1.5 grams of Compound VI. The tube is provided with a rubber stopper carrying a stirrer and a glass tube. The contents are purged with nitrogen and evacuated; the process being repeated 4 times. The contents are then heated until melted at 255°C. under nitrogen, about 20 minutes, stirred under nitrogen at 255°C. for 0.5 hour and then stirred for 1 hour at 255°C. at a pressure of less than 1 torr. The polymer is then put under nitrogen and cooled. The polymer is cut to flake and the nitrogen content determined. The polymer is calculated to contain 0.09% basic nitrogen. The flake is solid-phase polymerized at 190°C. at a pressure of less than 1 torr for 113 hours and this product is found to have a relative viscosity of 33.3.

The polymer is then spun into a 5-filament yarn at a spinning block temperature of 255°C. and a spinneret temperature of 260°C. and wound to a package. The spun yarn is drawn over a hot pin at 80°C. The draw ratio is 2.5 and the feed roll speed is 16.7 yards (15.3 meters) per minute. Two of the drawn yarns are plied. The plied yarn has a denier of 64, a tenacity of 1.8 grams per denier and an elongation of 59%. The plied yarn is knit to a fabric and the fabric scoured and dyed at pH 3.0 and 4.5, using the procedure described in Example 1. At pH 3.0, the fabric dyes to a dark blue and at 4.5 to a medium blue.

EXAMPLE 7

This example illustrates the use of a reduced amount of Compound VI in preparing filaments of a different acid-dyeable copolyester.

A dry ethylene terephthalate polyester having a relative viscosity of 25.0 and containing about 10 mole percent 2,2-dimethyl-1,3-propanediol units is placed in a polymer test tube with 2.1 grams of Compound VI. The tube is provided with a rubber stopper carrying a stirrer and a glass tube. The contents are purged with nitrogen and evacuated; the process being repeated 4 times. The contents are then heated until melted at 255°C. under nitrogen, about 20 minutes, stirred under nitrogen at 255°C. for 0.5 hour and then stirred for 2 hours at 255°C. at a pressure of less than 1 torr. The polymer is then put under nitrogen and cooled. The polymer is cut to flake and the nitrogen content determined. The polymer is calculated to contain 0.07% basic nitrogen. The polymer has a relative viscosity of 15.0.

The polymer is then spun into a 5-filament yarn at a spinning block temperature of 250°C. and a spinneret temperature of 255°C. and wound to a package. The spun yarn is drawn over a hot pin at 85°C. The draw ratio is 3.0 and the feed roll speed is 16.7 yards (15.3 meters) per minute. Two of the drawn yarns are plied. The plied yarn has a denier of 136, a tenacity of 1.2 grams per denier and an elongation of 74%. The plied yarn is knit to a fabric and the fabric scoured and dyed at pH 3.0 and 4.5 using the procedure described in Example 1. At pH 3.0, the fabric dyes to a dark blue and at 4.5 to a medium blue.

EXAMPLES 8-19

These examples illustrate the use of the following in the preparation of acid-dyeable polyester filaments: 5-[(1,2,2,6,6-pentamethyl-4-piperidinyl)sulfamoyl-]isophthalic acid, dimethyl ester, Compound VII; 5-[(2,2,6,6-tetramethyl-4-piperidinyl)sulfamoyl]isophthalic acid, diethyl ester, Compound VIII; 5-[(2,2,6,6-tetramethyl-4-piperidinyl)sulfamoyl]-isophthalic acid, Compound IX; 5-[(1,2,2,6,6-pentamethyl-4-piperidinyl)sulfamoyl]isophthalic acid, Compound X; [(2,2,6,6-tetramethyl-4-piperidinyl)sulfamoyl]fluorene-9,9-dipropionic acid, dimethyl ester, Compound XI; N,N'-[6-([2,2,6,6-tetramethyl-4-piperidyl]amino)-s-triazine-2,4-diyl]diglycine, Compound XII; 2,4-dimethoxy-6-[(2,2,6,6-tetramethyl-4-piperidyl)amino]s-triazine, Compound XIV; and 2,4-dimethoxy-6-[(1,2,2,6,6-pentamethyl-4-piperidyl)amino]-s-triazine, Compound XV. The modified polyesters, filaments, fabrics and dyed fabrics are prepared using the procedures described in Example 5. The polymers used for melt blending with the above compounds are polyethylene terephthalate (2GT), polyethylene terephthalate containing copolymerized adipate units corresponding to 5.5 mole percent adipic acid (2GT/6) and a polyethylene terephthalate prepared using 10 mole percent of 2,2-dimethyl-1,3-propanediol (2G/DM3GT).

Conditions and results are shown in Tables I–IV.

Conditions and results are shown in Tables I-IV.

TABLE I

| Ex. No. | Modifier Compound | Melt Blend Temp., °C. | POLYMER Composition | Relative Viscosity |
|---|---|---|---|---|
| 8 | VII | 255 | 2GT/6 | 19.5 |
| 9 | VII | 255 | 2GT/6 | 19.5 |
| 10 | VIII | 255 | 2GT/6 | 19.5 |
| 11 | XI | 255 | 2GT/6 | 19.5 |
| 12 | X | 255 | 2GT/6 | 18.8 |
| 13 | IX | 283 | 2GT/6 | 18.8 |
| 14 | IX | 255 | 2G/DM3GT | 25.0 |
| 15 | X | 283 | 2GT | 16.4 |
| 16 | IX | 283 | 2GT | 23.5 |
| 17 | XII | 255 | 2GT/6 | 18.8 |
| 18 | XIV | 255 | 2GT/6 | 30.8 |
| 19 | XV | 255 | 2GT/6 | 30.8 |
| 20A | IX | 283 | * | * |
| 20B | IX | 283 | * | * |

*Di(2-hydroxyethyl)terephthalate monomer used.

TABLE II

| Ex. No. | Basic Nitrogen Content, % | Solid-Phase Polymerization, Hours | Polymer, Rel. Visc. | Spinning Temps., °C. Block | Spinneret |
|---|---|---|---|---|---|
| 8 | 0.13 | 113 | 14.0 | 250 | 256 |
| 9 | 0.08 | 113 | 26.3 | 250 | 254 |
| 10 | 0.08 | 113 | 31.0 | 251 | 252 |
| 11 | 0.08 | 113 | 27.5 | 258 | 261 |
| 12 | 0.08 | 90 | 61.7 | 280 | 285 |
| 13 | 0.13 | 0 | 17.3 | 260 | 265 |
| 14 | 0.06 | 0 | 18.7 | 262 | 265 |
| 15 | 0.08 | 48 | 16.8 | 280 | 282 |
| 16 | 0.14 | 70 | 16.1 | 283 | 287 |
| 17 | 0.14 | 0 | 20.6 | 260 | 260 |
| 18 | 0.12 | 112 | 24.5 | 265 | 264 |
| 19 | 0.02 | 190 | 80.8 | 280 | 280 |
| 20A | 0.28 | 0 | 36.6 | 285 | 285 |
| 20B | 0.12 | 432 | 34.0* | 294 | 298 |

*Calculated

TABLE III

| Ex. No. | Draw Ratio* | Hot Pin Temp., °C | Properties of the 2-Plied Yarn | | |
|---|---|---|---|---|---|
| | | | Denier | Tenacity, gpd. | Elongation % |
| 8 | 4.5 | 83 | 64 | 2.2 | 41 |
| 9 | 3.5 | 83 | 56 | 2.3 | 49 |
| 10 | 3.5 | 83 | 40 | 3.1 | 34 |
| 11 | 4.5 | 83 | 56 | 2.9 | 23 |
| 12 | 3.5 | 83 | 51 | 2.7 | 46 |
| 13 | 2.5 | 85 | 89 | 1.3 | 74 |
| 14 | 3.0 | 85 | 128 | 1.2 | 54 |
| 15 | 3.0 | 85 | 123 | 1.3 | 76 |
| 16** | 2.5 | 85 | 38 | 1.0 | 87 |
| 17 | 3.0 | 85 | 77 | 1.5 | 96 |
| 18 | 4.0 | 85 | 115 | 2.1 | 42 |
| 19 | 4.0 | 85 | 92 | 2.9 | 12 |
| 20A | 3.0 | 85 | 204 | 0.6 | 37 |
| 20B | 3.0 | 85 | 98 | 1.6 | 65 |

*Feed roll speed is 16.7 yards (15.3 meters) per minute for Examples 8–20B

TABLE IV

| Ex. No. | Shade From Dyeing | |
|---|---|---|
| | pH = 3.0 | pH = 4.5 |
| 8 | Dark | Dark |
| 9 | Dark | Dark |
| 10 | Dark | Dark |
| 11 | Dark | Dark |
| 12 | Medium | Light |
| 13 | Dark | Dark |
| 14 | Light | Light |
| 15 | Medium | — |
| 16* | Dark | Medium |
| 17 | — | Light |
| 18 | Light | Light |
| 19 | Light | — |
| 20A | — | Medium |
| 20B | Medium | Medium |

*Skein dyed

EXAMPLE 20

This example illustrates the use of di(2-hydroxyethyl) terephthalate and two different concentrations of Compound IX in preparing acid-dyeable copolyester filaments.

Run A

Into a 500-milliliter, 3-necked, round-bottomed flask is placed 100 grams of di(2-hydroxyethyl) terephthalate, 3.8 grams of Compound IX, 4 milliliters of $Sb_2O_3$ in ethylene glycol (taken from a stock solution containing 1.4 grams of $Sb_2O_3$ in 100 milliliters of ethylene glycol). The round-bottomed flask is provided with a stirrer and an inlet-outlet tube. The contents are purged with nitrogen and evacuated; the process being repeated 4 times. The contents are heated under nitrogen in a salt bath at 283°C. until melted. The pressure is then reduced to 1.0 torr over a period of 15 to 20 minutes. The contents are maintained at not greater than 1.0 torr, and at 283°C. for 1 hour. The polymer is then cooled under nitrogen and cut to flake and the nitrogen content determined.

Run B

In a 2-liter, 3-necked, round-bottomed flask is placed 500 grams of di-(2-hydroxyethyl) terephthalate, 11.3 grams of 5-[(2,2,6,6-tetramethyl-4-piperidinyl)sulfamoyl]-isophthalic acid and 20 milliliters of $Sb_2O_3$ in ethylene glycol (taken from a stock solution containing 1.4 grams of $Sb_2O_3$ in 100 milliliters of ethylene glycol). The flask is provided with a stirrer and an inlet-outlet tube. The contents are purged with nitrogen and evacuated; the process being repeated 4 times. The contents are heated under nitrogen in a salt bath at 283°C. for 0.5 hour. The pressure is then reduced to 1.0 torr over a period of 15 to 20 minutes. The contents are maintained at 0.05 torr at 283°C. for 1 hour. The polymer is then cooled under nitrogen, cut to flake, the nitrogen content determined and solid-phase polymerized.

Filament and fabric preparation and dyeings are carried out using the procedures described in Example 5. Conditions and results are shown in Tables I–IV.

I claim:

1. Acid-dyeable textile fibers or filaments of a linear glycol-terephthalate copolyester with a minor proportion, sufficient to provide at least 0.02 weight percent nitrogen, of a 2,2,6,6-tetramethylpiperidine compound having substituents at the 1 and/or 4 positions on the tetramethylpiperidine ring which comprises a total of two ester-forming groups, each group being attached directly to the tetramethylpiperidine ring or attached to a tetramethylpiperidine ring substituent.

2. Fibers or filaments as defined in claim 1 wherein the copolyester comprises at least 85 mole percent ethylene terephthalate units.

3. Fibers or filaments as defined in claim 2 wherein the copolyester comprises 2 to 10 weight percent ethylene adipate units.

4. Fibers or filaments as defined in claim 1 wherein the copolyester comprises an amount of tetramethylpiperidine compound which provides 0.02 to 0.25 weight percent nitrogen, based on the weight of copolyester.

5. Fibers or filaments as defined in claim 1 wherein the tetramethylpiperidine compound has substituents at the 1 and 4 positions of the tetramethylpiperidine ring and each substituent comprises an ester-forming group.

6. Fibers or filaments as defined in claim 1 wherein the tetramethylpiperidine compound is a glycol.

7. Fibers or filaments as defined in claim 1 wherein the tetramethylpiperidine compound is a dicarboxylic acid.

8. Fibers or filaments as defined in claim 1 wherein the tetramethylpiperidine compound is a hydroxy acid.

9. Fibers or filaments as defined in claim 1 wherein the tetramethylpiperidine compound is an s-triazine derivative containing two ester-forming groups.

10. Fibers or filaments as defined in claim 1 wherein the tetramethylpiperidine compound is 1-(2-hydroxyethyl)-2,2,6,6-tetramethyl-4-hydroxypiperidine.

11. Fibers or filaments as defined in claim 1 wherein the tetramethylpiperidine compound is 1-(2-hydroxy-2-methylethyl)-2,2,6,6-tetramethyl-4-hydroxypiperidine.

12. Fibers or filaments as defined in claim 1 wherein the tetramethylpiperidine compound is 5-[(2,2,6,6-tetramethyl-4-piperidinyl)sulfamoyl]isophthalate.

13. Fibers or filaments as defined in claim 1 wherein the tetramethylpiperidine compound is 5-[(2,2,6,6-tetramethyl-4-piperidinyl)sulfamoyl]isophthalic acid.

14. Fibers or filaments as defined in claim 1 wherein the tetramethylpiperidine compound is 5-[(1,2,2,6,6-pentamethyl-4-piperidinyl)sulfamoyl]isophthalate.

15. Fibers or filaments as defined in claim 1 wherein the tetramethylpiperidine compound is [(2,2,6,6-tetramethyl-4-piperidinyl)sulfamoyl]fluorene-9,9-dipropioniate.

16. Fibers or filaments as defined in claim 1 wherein the tetramethylpiperidine compound is 2,2'-[4,6-bis(2,2,6,6-tetramethyl-4-piperidyl]amino)-s-triazine-2-ylimino]-diethanol.

* * * * *